(12) United States Patent
Bauder

(10) Patent No.: US 7,527,732 B2
(45) Date of Patent: May 5, 2009

(54) HOUSING CLOSURE FOR A FILTER

(75) Inventor: Ralf Bauder, Ketsch (DE)

(73) Assignee: Mann & Hummel GmbH, Ludwigsburg (DE)

( * ) Notice: Subject to any disclaimer, the term of this patent is extended or adjusted under 35 U.S.C. 154(b) by 305 days.

(21) Appl. No.: 11/647,365

(22) Filed: Dec. 29, 2006

(65) Prior Publication Data

US 2007/0151462 A1  Jul. 5, 2007

Related U.S. Application Data

(63) Continuation of application No. PCT/EP2005/053058, filed on Jun. 29, 2005.

(30) Foreign Application Priority Data

Jun. 30, 2004 (DE) .................. 10 2004 031 608

(51) Int. Cl.
*B01D 35/30* (2006.01)
*B65D 45/00* (2006.01)
*A47J 24/08* (2006.01)

(52) U.S. Cl. .................. 210/232; 210/238; 220/314; 220/316; 220/318

(58) Field of Classification Search .......... 210/232, 210/238; 220/314, 316, 318
See application file for complete search history.

(56) References Cited

U.S. PATENT DOCUMENTS 4,659,466 A * 4/1987 Farr et al. .................. 210/238

| 4,985,142 | A | * | 1/1991 | Laycock et al. .............. 210/130 |
| 5,678,721 | A | | 10/1997 | Cartigny et al. |
| 6,245,229 | B1 | * | 6/2001 | Kool et al. .................. 210/232 |
| 6,984,320 | B2 | * | 1/2006 | Bartkus et al. .............. 210/238 |
| 2003/0006180 | A1 | | 1/2003 | Taylor, Jr. |
| 2003/0226798 | A1 | | 12/2003 | Hawkins et al. |

FOREIGN PATENT DOCUMENTS

| DE | 33 27 439 A1 | 2/1985 |
| WO | WO 03/070352 A1 | 8/2003 |
| WO | WO 2004/041037 A1 | 5/2004 |

OTHER PUBLICATIONS

International Search Report dated Sep. 26, 2005. (Three (3) pages).

* cited by examiner

*Primary Examiner*—Thomas M Lithgow
(74) *Attorney, Agent, or Firm*—Crowell & Moring LLP

(57) ABSTRACT

A filter assembly (10) including a housing (11) which is used to receive a filter medium and is closed by a lid or cover (14) in a sealed manner. The cover (14) is fixed by fixing elements (15) to an axial end face of the housing (11), and a seal is arranged between the cover (14) and the housing (11). Fixing contours (24) are provided on the outer peripheral surfaces of the housing (11) on the front side of the assembly. The fixing element (15) is arranged on the outer front side of the cover (14) so as to be pivotable such that the fixing element (15) can be displaced essentially parallel to the front side of the cover (14). When positioned parallel to the front side of the cover, the fixing element (15) creates a positively locking connection between the cover (14) and the housing (11), and when in the opened and pivoted state, the fixing element (15) forms a grip or handle for handling the cover (14).

9 Claims, 3 Drawing Sheets

HOUSING CLOSURE FOR A FILTER

CROSS REFERENCE TO RELATED APPLICATIONS

This application is a continuation of international application no. PCT/EP2005/053058, filed Jun. 29, 2005 designating the United States of America, and published in German on Jan. 12, 2006 as WO 2006/003160, the entire disclosure of which is incorporated herein by reference. Priority is claimed based on Federal Republic of Germany patent application no. DE 10 2004 031 608.2, filed Jun. 30, 2004.

BACKGROUND OF THE INVENTION

The present invention relates to a filter housing that is closed by a lockable lid and to a method for opening or closing such a filter housing.

Many different configurations of housing closures of this type are known in the art. The filter housing disclosed in U.S. Pat. No. 6,117,312 (=DE 195 46 440), in which a filter element is inserted and which can be tightly closed with a lid, is just one example among many. A recess on the lid on the housing side forms an annular collar, which communicates with the cylindrical opening of the housing. Along the edge area of the lid, the lid is clamped and fixed to the housing by screws. A disadvantage of this solution is that the internal threads in the housing and the screw holes in the lid are expensive to manufacture. Furthermore, additional screws are required, which are loose parts and as such can be lost during installation or dropped into the interior of the housing. The installation of the screwed connection is particularly time-consuming because housing closures of this type are often located in places that are difficult to access. As a result, extra space must be provided for mounting the lid in these difficult-to-access places.

SUMMARY OF THE INVENTION

It is an object of the present invention to provide an improved closure mechanism for a lid of a filter housing.

Another object of the invention is to provide a housing connection for a filter housing that takes up little space.

A further object of the invention is to provide a housing closure arrangement which assures a simple mounting process.

An additional object of the invention is to provide a filter housing closure arrangement which can be used in places that are difficult to access and requires no tools.

These and other objects are attained in accordance with the present invention by providing a filter assembly comprising a housing for receiving a filter medium for filtering a fluid, and a lid for closing the housing in a sealed manner, said lid being fixed to an end face of the housing by at least one fastening member, and a seal being disposed between the lid and the housing, wherein at least one fastening contour is disposed along an outer peripheral face of the housing in the area of the end face, and a fastening member is disposed on an outer end face of the lid so that the fastening member can be pivoted and displaced substantially parallel to the end face of the lid, said fastening member, in the closed state, forming a positive-locking connection between the lid and the housing and, in an open and pivoted state, forming a grip or handle for handling the lid.

The housing closure of a filter housing according to the invention has a lid that completely covers one end face of the housing. The lid is provided with contours on the side of the face of the filter housing, which communicate with the face of the housing and thereby produce a tight connection. These contours may be conical or cylindrical.

Typically the sealing face of the lid is formed as a cylindrical recess that communicates with cylindrical peripheral surfaces of the end face of the housing. In the arrangement with cylindrical sealing faces it is advantageous to dispose a radial sealing ring between the sealing faces, which may be arranged either in a groove of the cylindrical sealing face of the lid or in the housing. On the end face of the housing, circumferential outward-facing fastening contours are formed, which are positive-locking fastening points for a fastening member formed on the lid. These fastening contours on the housing side may be lug-type projections or webs disposed in segments in the area of the end face of the housing.

A fastening member is movably seated on the end face of the lid and, in a closed state, produces a lock between the lid and the housing. The fastening member is seated so as to be pivotable relative to the end face of the lid and, in a folded-down state, in which it is approximately parallel to the and face of the lid, can be displaced on the lid.

For pivotable seating of the fastening member on the lid, rib-like supporting webs are formed on the end face of the lid, which receive a spindle and thus act as a hinge for the fastening member. The fastening member itself consists of at least one yoke, which is pivotably supported in the hinge of the lid on one side. Opposite the side of the hinge, the yoke has claws, which in the folded-down state project over the peripheral surfaces of the lid and—with displacement in the hinge— overlap the fastening contour of the housing and thereby create a lock between the lid and the housing. Thus, the yoke can be displaced on the lid only in the folded-down state. This can be achieved by providing the fastening yoke with elongated holes at the connection to the hinge.

The lid serves not only to tightly close the housing but often also to fasten a filter element installed in the filter housing, which as a rule is axially fixed by the lid. Consequently, the lid must also counteract an axial pressure created by the filter element. As a result, the claws overlapping the fastening contour must be adapted to the potential stress loading of the lid.

To obtain greater stability, the claws overlap in segments both the fastening contour of the housing and an outer edge of the end face. To generate an axial clamping force between the lid and the end face of the housing, trapezoidal circumferential webs may be disposed on the end face of the housing. The cross-section of the trapezoidal webs may be tapered in such a way that when the claw is inserted the tapered shape generates a pressing force. To close the lid, the lid is placed onto the communicating contour of the housing after the filter element has been installed in the housing and is pushed into its sealing position. A partial fixation of the lid may also be effected by holding claws disposed on the housing into which the lid may be rotated over an edge at its end face. In this case, the fastening member is disposed opposite the fixed holding claws of the housing.

After pivoting the lid into the communicating contour of the housing, the lid is interlocked with the housing by displacing the fastening member.

To remove the lid, the fastening member is pushed out of the locked position and pivoted upwardly perpendicular to the end face of the lid. To remove the lid, the fasting element may be used as a handle to extract the lid from the housing. Materials suitable for the lid and the housing as well as the additional movable parts are aluminum or magnesium diecastings as well as plastics, such as fiber reinforced polyamide, polyethylene, polybutyl, polypropylene or acrylonitrile butadiene styrene.

The invention makes it possible to insert the lid in places where clearance is very limited. Simplified handling for locking the closure clearly minimizes installation time, and no tools are required. The manual force applied to remove the lid can be ideally transmitted with the use of the fastening member as an extraction handle. This is particularly advantageous if the lid sticks after relatively long filter servicing intervals.

In one advantageous embodiment of the filter, radial or axial seals are disposed between the communicating area of the lid and the housing. In this case, one or more grooves are usually formed in the cylindrical side facing the housing, with radial sealing rings integrated into these grooves. However, the radial sealing rings may also be disposed on the inner circumferential faces of the housing. It is also possible to dispose an axial seal at the end faces between the lid and the housing or to use both axial and radial sealing rings. Using several seals or adjusting the sealing concept makes it advantageously possible to ensure tightness even if the pressure differential is relatively high. An axial seal furthermore minimizes the entry of dirt into the sealing area, including during servicing.

In another advantageous embodiment of the invention, a fastening contour in the form of a radial web is disposed on the housing in the area of the end face of the housing. This web has a substantially trapezoidal shape and uniformly encloses the housing. In the closed and locked state, the web is clasped by the claws of the fastening member. The web may also have an undercut so that the claws can snap into it. The radial web of the housing has the advantage of enabling the claws of the fastening member to engage in segments over a large area, thereby increasing the fastening force between the housing and the lid. If the bead or the web is circumferentially configured, the lid can be positioned on the housing in any rotational position, which is an additional advantage with regard to the installation of the lid.

In yet another advantageous embodiment of the invention, the fastening member can be fixed in its displacement positions. The lid is seated in the housing and locked by the fastening members is subject to shock and vibration loading during operation, which makes it necessary to prevent the fastening member from moving out of its displacement position by itself. Here, it is possible to use elongated holes formed in the fastening yoke of the fastening member and engaging with a pin of the hinge to obtain a locking connection. This locking contour of the elongated holes allows the fastening yoke to be fixed at different locking positions. It is of course also possible to fix the pin to the fastening yoke and integrate the elongated holes in the webs of the lid.

The displacement position can of course also be secured by additional components, such as springs or securing pins. The advantage of using a locking connection to fix the fastening member is that no additional components are necessary. Furthermore, no tools whatsoever are required for fixation, and handling is ensured even in locations that are difficult to access.

According to yet another advantageous embodiment of the invention, the lid is fastened by a plurality of fastening members disposed on the lid, which are symmetrically arranged relative to each other on the housing. In principle, providing a plurality of fastening members makes it possible to enclose a larger circumferential area of the connection, such that even two fastening members will ensure complete enclosure. It is also possible, however, to use four or more fastening members, making it possible to reduce the displacement path of the fastening members while providing the same enclosure of the lid.

A symmetrical arrangement of the fastening members has the advantage that the fastening members are disposed exactly opposite each other and the fastening yokes, which provide the connection between the lid and the fastening member, are disposed inline, so that the hinges supporting the pivoting and shifting of the fastening members can be used jointly by opposite fastening members. This makes it possible to use one pin to support a plurality of fastening yokes that are disposed parallel and offset to each other.

In yet another advantageous embodiment, the fastening members are formed as semicircular segments and cover the lid completely when they are folded down. The semicircular fastening members are likewise received by fastening yokes and pivotably connected to the lid, such that the planar fastening member covers the fastening yoke in this embodiment.

In the unlocked position, the fastening members are pushed outwardly in a hinge with an elongated hole and can thus be folded up through an approximately 90-degree angle of movement so that they can be used as extraction handles. Here, too, the claws of the fastening member can clasp the fastening contour over the entire circumference. To reduce the displacement path of the fastening member across the clamping range, clasping by the claws in the corner areas of the semicircular fastening members is dispensed with.

Preferably, the lid and the fastening yokes are integrally arranged. This stabilizes the lid as well as the connection between the claws and the fastening yokes. Additional advantages are that the fastening members, when folded down, cover the housing lid completely, so that the lid is protected against dirt and mechanical damage, and a smooth surface offers fewer opportunities for dirt and oil deposits to collect.

Yet another embodiment of the invention has a plurality of fastening yokes for connecting the fastening member to the lid. The fastening yokes form not only the pivotable and displaceable support relative to the hinge of the lid but also stabilize the connection to the claws, particularly if they are rib-shaped and are integrally injection molded on a planar surface of the fastening member. This also has the advantage of minimizing loading by moments of forces applied to the individual fastening yokes.

The method according to the invention for fastening and releasing a lid on the housing of a filter assembly as claimed in claim 1 makes it possible to fasten and release the lid on the filter housing by simple handling without using tools. To fasten the lid, it is grasped manually in its folded-up state, in which the fastening members are pivoted approximately 90 degrees relative to the end face of the lid, and is positioned on the housing. The lid is placed onto the communicating contour of the housing and then pressed into and seated in the contour of the housing. The fastening yokes are pivoted downwardly substantially parallel to the end face and can then be pushed inwardly. As the fastening members are pushed inwardly, the claw-shaped contour overlaps a fastening contour formed in the area of the end face of the housing. This positively interlocks the fastening member with the housing. The overlapping axial width of the claws is adapted to both the fastening contour of the housing and the lid, so that if the lid is incorrectly positioned on the housing it cannot lock. This has the advantage of preventing incorrect positioning of the lid as a result of poor accessibility or dirt that has accumulated between the lid and the housing.

Since the lid on the filter housing often has the additional function of fixing a filter element within the filter housing, an incorrectly installed filter element may cause the lid to be malpositioned, resulting in a loss of tightness between the housing and the lid. In the filter assembly according to the invention this potential mispositioning also is prevented.

To remove the lid, the fastening members are shifted outwardly to unlock the positive-locking connection between the lid and the housing. The fastening members can then again be pivoted upwardly and used as an extraction handle of the lid. Here, the dual function of the fastening members is advantageously used both for the positive-locking connection and for simple handling.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail with reference to illustrative preferred embodiments shown in the accompanying drawing figures, in which.

DETAILED DESCRIPTION OF PREFERRED EMBODIMENTS

Figure 1:
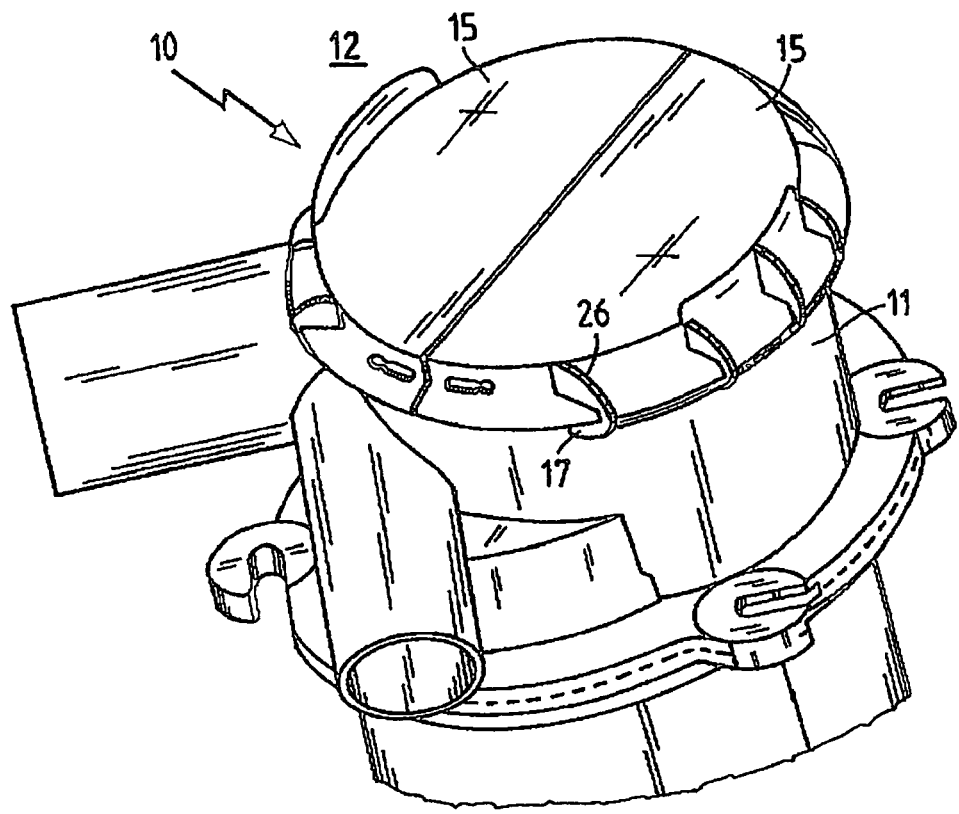
FIG. 1 is a perspective view of a filter assembly according to the invention with a locked lid.

FIG. 1 shows the filter assembly 10 according to the invention in a perspective view. The housing 11, only part of which is shown, is closed by the lid 14, which is located underneath the fastening members 15 but is visible in FIG. 2. The fastening members 15 in this embodiment are configured as two half-shells and overlap the lid 14 completely. Along the peripheral sides of the fastening members 15, claws 17 are provided, which enclose a circumferential web 24 of the housing depicted in FIG. 3 and the outer perimeter of the hidden lid 14. This seals the outside 12 relative to the housing side 13.

Figure 2:
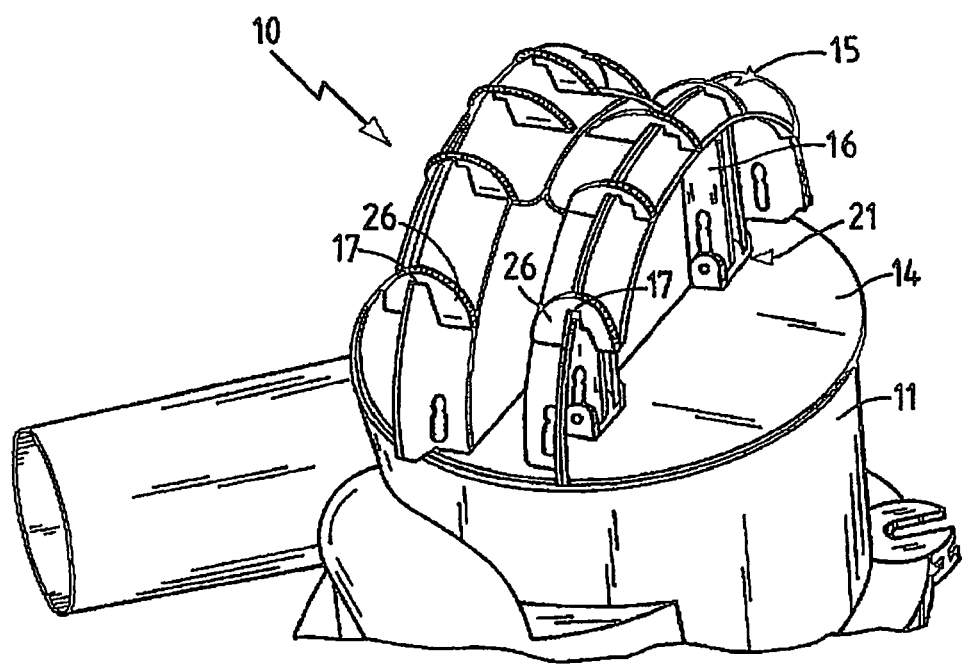
FIG. 2 shows the filter assembly of FIG. 1 with an open and pivoted lid.

In FIG. 2, components corresponding to those shown in FIG. 1 are identified by the same reference numerals. FIG. 2 shows the filter assembly 10 with the lid 14 inserted into the communicating contour of the housing 11 and the fastening member 15 pivoted upwardly and thereby serving as a handle to extract the lid 14. The fastening member 15 is integrally formed with the fastening yoke 16. The hinged connection 21 pivotably and displaceably supports the fastening yoke 16 and the lid 14. The contour of the claws 17, which in the closed state interlock with the housing, is visible on the folded-up fastening member 15. To stabilize the claws 17, ribs 26 are formed along the periphery of the fastening member 15.

Figure 3:
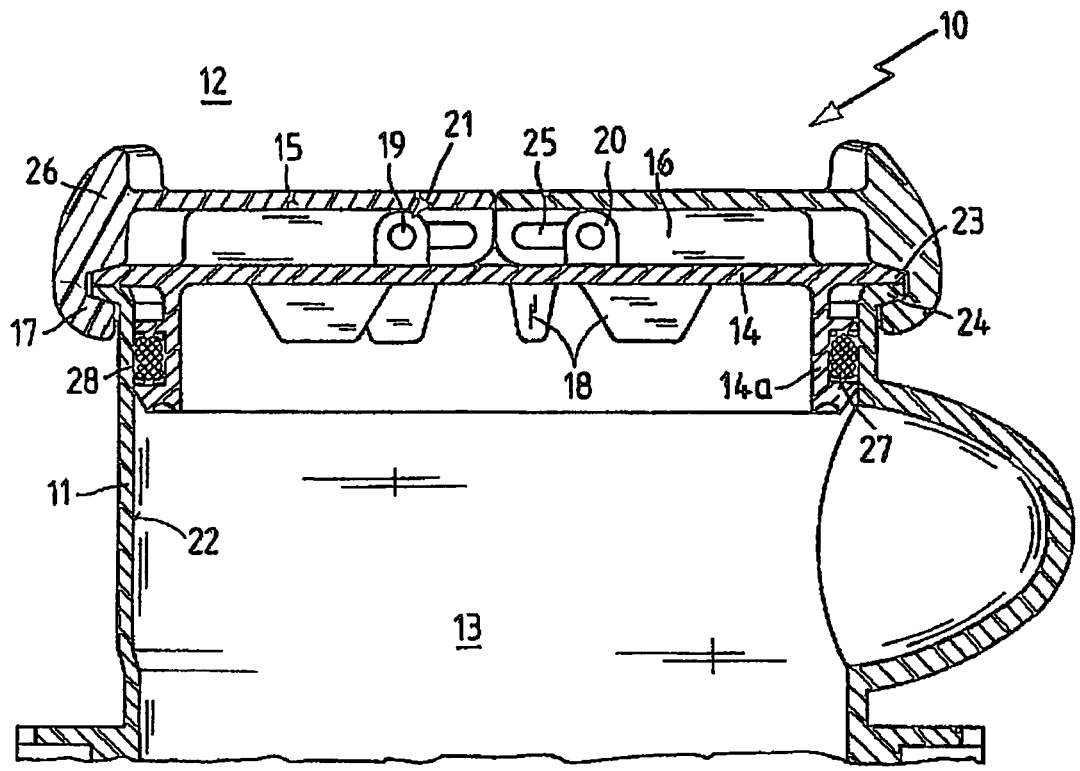
FIG. 3 is a sectional view of the filter housing with locked lid; components identical to those of the preceding figures are provided with the same reference numbers.

FIG. 3 is a full sectional view of the filter assembly 10 according to the invention. The recess 14a of the lid is inserted into the cylindrical surface 22 of the housing 11. To form a hinge, support webs 20 are disposed on the lid 14, fixing a pin 19. The pin 19 in conjunction with the fastening yoke 16 serves to receive the fastening member 15. In the fastening yoke 16, elongated holes with locking means 25 are formed, which are included in the hinged connection 21 and are displaceable along the longitudinal axis of the elongated hole 25 to permit the fastening member 15 to be pivoted upwardly at the extreme end position. The claws 17 along the peripheral outer rim of the fastening member 15 enclose both a circumferential web 24 of the housing 11 and a circumferential web of the lid 23 and thereby cause positive locking between the lid 14 and the housing 11. In the example shown here, the wedge-shaped configuration of the claw 17 makes it possible to achieve an axial pressing force between the lid 14 and the housing 11. The projections 18 provided on the housing side 13 of the lid 14 have the function of axially and radially securing a filter element (not shown) within the housing.

Figure 4:
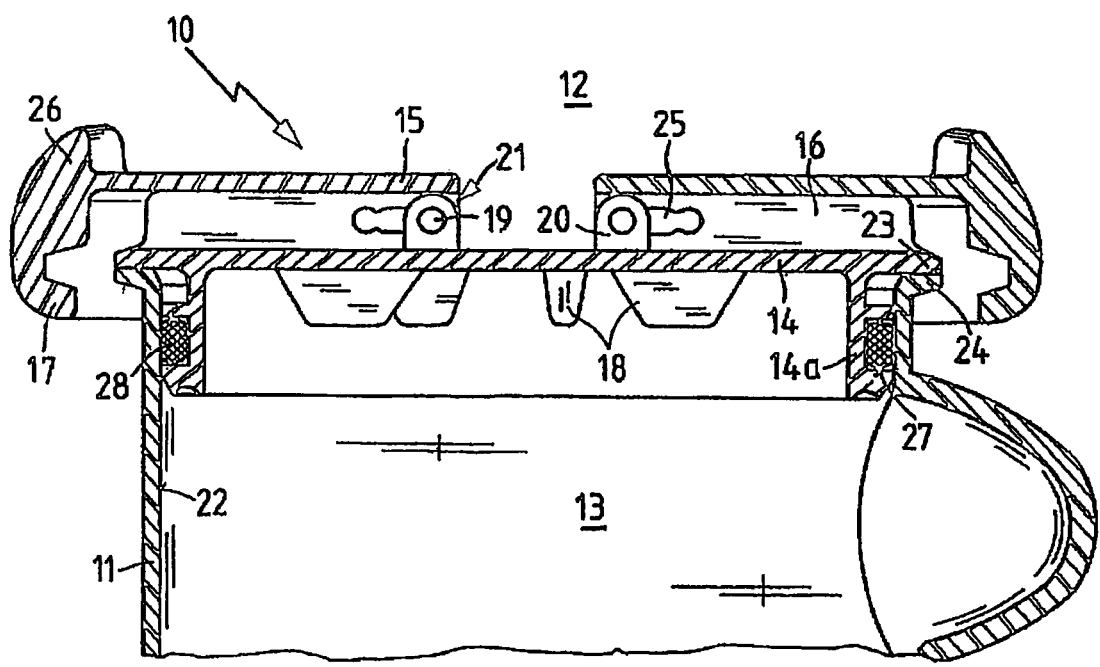
FIG. 4 is a full section of a filter assembly with unlocked lid; components identical to those of the preceding figures are provided with the same reference numbers.

In FIG. 4, the fastening member 15 is pushed outwardly in the elongated hole 25, thereby releasing the lock between the housing 11 and the lid 14 produced by the claws 17. The locking element visible within the elongated hole 25 generates a securing force that must be overcome as the fastening member 15 is displaced. In the lid recess 14a a groove 27 is formed to accommodate a radial sealing ring 28. This radial sealing ring 28 produces a tight connection between the cylindrical surface 22 and the lid 14.

Figure 5:
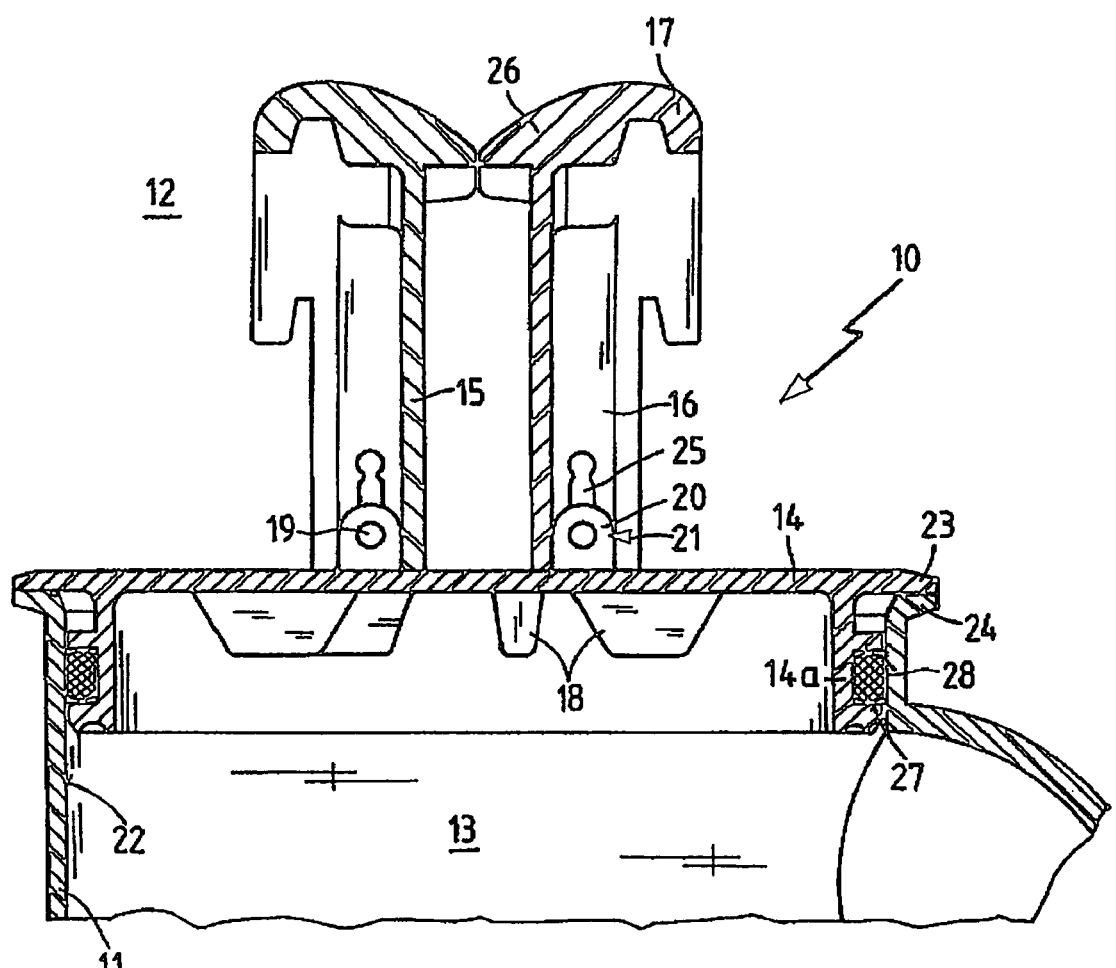
FIG. 5 is sectional view of the filter assembly of the invention with the fastening elements pivoted to serve as a grip or handle to open the lid.

FIG. 5 is a sectional side view of the housing closure of the invention corresponding to FIGS. 3 and 4, except that the fastening members 15 have been pivoted upwardly so that they are oriented generally perpendicular to lid 14. In this position, the claws 17 can be readily grasped as a handle and pulled by a user to withdraw the lid 14 from the housing opening to open the housing 11.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter assembly comprising a housing for receiving a filter medium for filtering a fluid, and a lid for closing the housing in a sealed manner, said lid being fixed to an end face of the housing by at least one fastening member, and a seal being disposed between the lid and the housing, wherein at least one fastening contour is disposed along an outer peripheral face of the housing in the area of the end face, and a fastening member is disposed on an outer end face of the lid so that the fastening member can be pivoted and displaced substantially parallel to the end face of the lid, said fastening member, in the closed state, forming a positive-locking connection between the lid and the housing and, in an open and pivoted state, forming a handle for handling the lid.

2. A filter assembly according to claim 1, wherein a radial or an axial seal is disposed between the housing and the lid.

3. A filter assembly according to claim 1, wherein the fastening contour on the housing is formed by a radial groove or a radial bead located in the area of the end face of the housing.

4. A filter assembly according to claim 1, wherein the fastening member overlaps a fastening contour in at least one circumferential segment.

5. A filter assembly according to claim 1, wherein the fastening member in the locked state is secured against displacement by a locking connection between the fastening member and the lid.

6. A filter assembly according to claim 1, wherein a plurality of fastening members are arranged symmetrically on the lid.

7. A filter assembly according to claim 1, wherein the fastening members are shell-shaped and, in the closed state, cover the lid in a substantially planar fashion.

8. A filter assembly according to claim 1, wherein each fastening member is connected to the lid by at least two fastening yokes.

9. A method for fastening and releasing a lid on a housing of a filter assembly according to claim 1, said method comprising grasping the lid by a handle pivoted perpendicular to the end face of the lid and pressing the lid onto the housing to seat the lid in the housing, wherein the handle is pivoted approximately parallel to the end face of the lid, and the handle, in a pivoted-down position serves as a fastening member; said fastening member, when displaced toward the inside of the lid, overlapping a fastening contour of the housing and positively locking the lid on the housing, and when displaced toward the outside of the housing, releasing the lock between the housing and the lid to release the lid, and after release of the lid, pivoting the fastening member perpendicular to the end face to form a handle by which the lid can be extracted from the housing.

* * * * *